United States Patent
Bala et al.

(10) Patent No.: US 6,335,992 B1
(45) Date of Patent: Jan. 1, 2002

(54) SCALABLE OPTICAL CROSS-CONNECT SYSTEM AND METHOD TRANSMITTER/ RECEIVER PROTECTION

(75) Inventors: Krishna Bala, New York City, NY (US); John K. Gamelin, Red Bank; Pankaj H. Bhatt, Tinton, both of NJ (US)

(73) Assignee: Tellium, Inc., Oceanport, NJ (US)

( * ) Notice: Subject to any disclaimer, the term of this patent is extended or adjusted under 35 U.S.C. 154(b) by 0 days.

(21) Appl. No.: 09/504,794

(22) Filed: Feb. 15, 2000

(51) Int. Cl.$^7$ .................................................. G02B 6/42
(52) U.S. Cl. .............................. 385/17; 385/16; 385/24; 359/115
(58) Field of Search ...................... 385/16–24; 359/109, 359/152, 115, 124

(56) References Cited

U.S. PATENT DOCUMENTS

| | | | |
|---|---|---|---|
| 5,002,349 A | 3/1991 | Cheung et al. | 350/96.13 |
| 5,414,540 A | 5/1995 | Patel et al. | 359/39 |
| 5,414,541 A | 5/1995 | Patel et al. | 359/39 |
| 5,434,700 A | 7/1995 | Yoo | 359/332 |
| 5,457,556 A | 10/1995 | Shiragaki | 359/117 |
| 5,802,232 A | 9/1998 | Bhat et al. | 385/122 |
| 5,825,517 A | 10/1998 | Antoniades et al. | 359/117 |
| 6,049,593 A | * 4/2000 | Acampora | 359/109 X |
| 6,154,583 A | * 11/2000 | Kuroyanagi et al. | 385/16 |

FOREIGN PATENT DOCUMENTS

| | | |
|---|---|---|
| EP | 0 721 275 A2 | 7/1996 |
| WO | WO 97/21289 | 6/1997 |
| WO | WO 97/29999 | 8/1997 |

OTHER PUBLICATIONS

K. Bala et al. "The Case for Opaque Multiwavelength Optical Networks".

Okamoto, et al. "Optical Path Cross–Connect Node Architectures for Photonic Transport Network," IEEE Journal of Lightwave Technology, vol. 14., No. 6, Jun. 1996.

Brackett et al. "A Scalable Multiwavelength Multihop Optical Network: A Proposal for Research on All–Optical Networks," IEEE Journal of Lightwave Technology vol. 5/6, May/Jun. 1993.

Lee, et al. "Routing and Switching in a Wavelength Convertible Optical Network".

Fujiwara, "Advanced Photonic Switching Technology for Communications", 2334b IEICE Tranactions on Communications vol. E78–B (1995) No. 5, May 1995.

Hill et al. "A Transport Network Layer Based on Optical Network Elements", Journal of Lightwave Technology, vol. 11, No. 5/6, May/Jun. 1993.

Alexander et al., "A Precompetitive Consortium on Wide–Band All–Optical Networks", Journal of Lightwave Technology, vol. 11, No. 5/6, May/Jun. 1993.

(List continued on next page.)

Primary Examiner—Phan T. H. Palmer
(74) Attorney, Agent, or Firm—Morgan, Lewis & Bockius LLP

(57) ABSTRACT

An optical cross-connect system and method allows service providers to economically and efficiently handle capacity upgrades to meet future demands. The optical cross-connect can be embodied as a three-stage switch having a first, a middle, and a last stage. Capacity upgrades may be accomplished by adding additional first and last stage switches to meet increased demand and by replacing the middle stage switches. Accordingly, the original first and last stage switches may be retained in the upgraded optical cross-connect. The resulting optical cross-connect may include both optical and electronic components and the upgrade may be performed without interrupting service.

49 Claims, 7 Drawing Sheets

OTHER PUBLICATIONS

Iqbal et al., "High Performance Optical Switches For Multiwavelength Rearrangeable Optical Networks", Government Microcircuit Application Conference, San Diego, CA., Nov., 1994, pp. 475–477.

Ford et al., "Wavelength–Selectable Add/Drop With Tilting Micromirrors" IEEE Lasers and Electro–Optics Society 1997 Annual Meeting.

Chang et al., "40 Gb/s WDM Cross–Connect with an Electronic Switching Core: Preliminary Results from the West Consortium" IEEE Lasers and Electro–Optics Society 1997 Annual Meeting vol. 2.

Zhou et al., "Cross talks in multiwavelength optical cross–connect networks", OFC 95 Tecnical Digest, pp. 278–280.

* cited by examiner

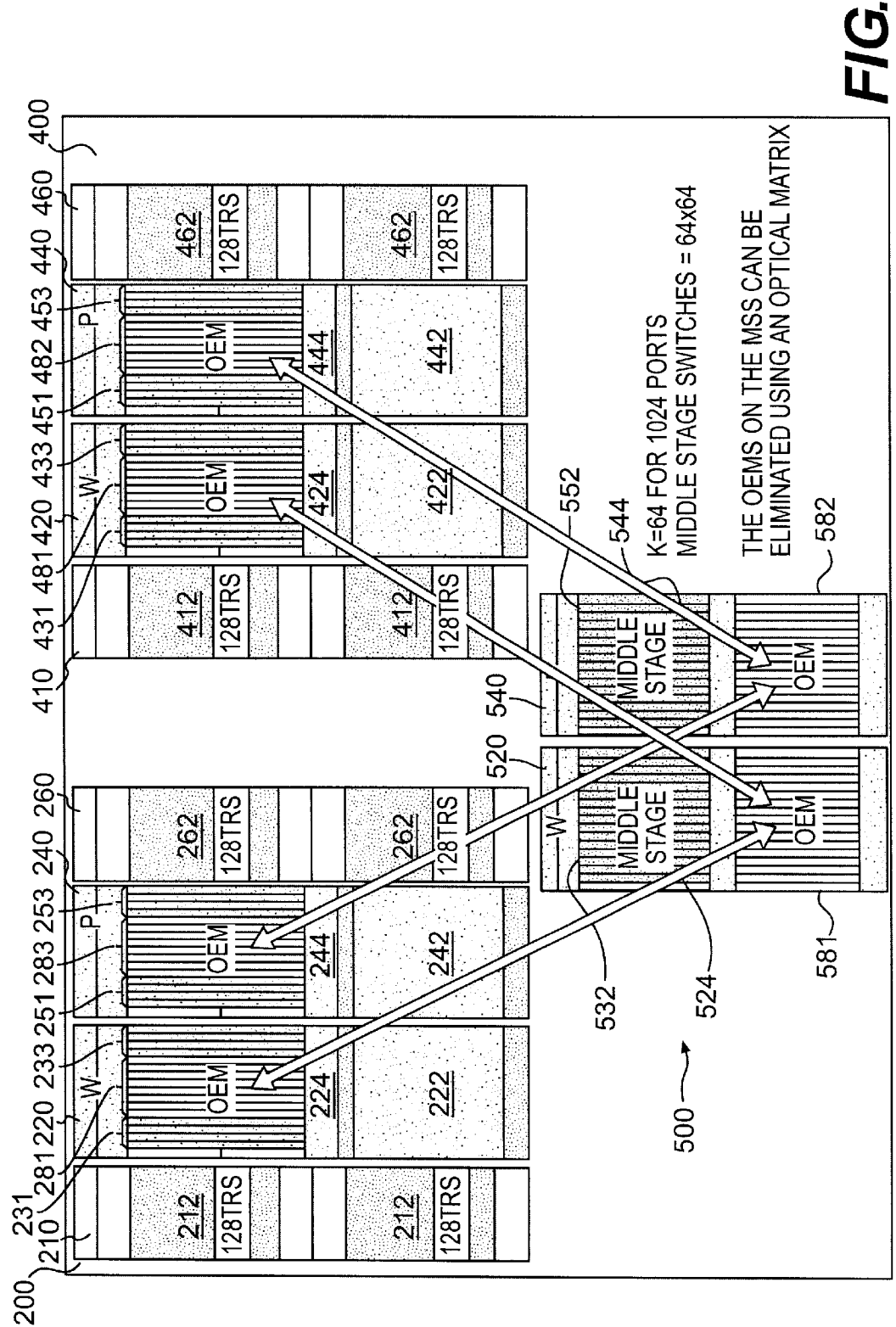

SCALABLE OPTICAL CROSS-CONNECT SYSTEM AND METHOD TRANSMITTER/ RECEIVER PROTECTION

BACKGROUND OF THE INVENTION

1. Field of the Invention

The present invention relates to a system and method for a scalable optical cross-connect in an optical telecommunications system and, in particular, an optical cross-connect system and method that efficiently and economically handle capacity upgrades.

2. Description of the Related Art

Advances in computer and network technology have made it simple and convenient to send and receive information throughout the United States, and indeed throughout the world. Internet usage has expanded rapidly within the past few years, and the information available and the number of people able to access that information has grown exponentially. It is now common to collect a variety of information through the Internet, including educational, consumer, recreational, and commercial information. More transactions are being conducted through the Internet and more business, medical, and government transactions are becoming paperless. Currently, huge volumes of information must be transferred to meet Internet and business communication demands.

As computer technology advances and today's possibilities become tomorrow's reality, the demand for information is expected to increase. For example, graphics and images require a significantly greater volume of data than does simple text. As quality graphics and real-time image processing applications become commonplace, additional huge volumes of data will need to be transferred rapidly. Moreover, video-on-demand services, video telephone and teleconferencing services, and medical image archiving and retrieval, to name just a few, are expected to expand in the coming years.

The telecommunications network serves as the pipeline through which the bulk of information is transferred. Network service providers have begun to turn to new types of optical equipment ideally suited to meet current and fixture demands for information. One such type of optical equipment is the optical cross-connect switch. Optical cross-connects (OXCs) perform switching operations in networks, such as ring and mesh networks, so that information can travel to its intended recipient. Optical cross-connects enable network service providers to switch high-speed optical signals efficiently. For example, an OXC stationed in Chicago may receive incoming information from New York and strip off the received information destined for Chicago, switch a portion of the received information to Houston, and switch another portion of the information to San Francisco.

However, optical switching equipment is expensive. There remains a need for systems and methods that can handle the information volumes anticipated in the near-term and that are capable of economically expanding to meet long term demands.

SUMMARY OF THE INVENTION

The present invention has been made in view of the above circumstances and has as an object to provide a simple and economical system and method for scaling optical communications equipment.

A further object of the invention is to provide a versatile optical cross-connect design capable of economically scaling to meet future needs.

A further object is to provide an efficient and economical method for upgrading the capacity of an optical cross-connect.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an optical cross-connect in an optical telecommunications network comprising a plurality of first stage switch matrices, first and second cabinets, a plurality of middle stage switch matrices having input ports and output ports, and a plurality of last stage switch matrices having input ports and output ports. Each of the first stage switch matrices have a plurality of input ports, each input port receiving an input communication signal, and a larger number of output ports, where the first stage switch matrices switch the input communication signals to selected output ports. Each of the first and second cabinets have a predetermined number of bays, with at least one of the first stage switch matrices housed in a bay of the first cabinet and at least one of the first stage switches housed in a bay of the second cabinet. The input ports of the middle stage switch matrices are coupled to the output ports of the first stage switch matrices for receiving communication signals output from the first stage switch matrices. The middle stage switch matrices switch communications signals received at their input ports to their output ports. The input ports of the last stage switch matrices are coupled to the output ports of the middle stage switch matrices for receiving communication signals output from said middle stage switch matrices. The last stage switch matrices switch communications signals received at their input ports to their output ports. In addition, the middle stage itself can be recursively a multistage switch.

The invention further comprises an optical telecommunications network comprising a plurality of network nodes interconnected via fiber optic links, wherein at least one of the network nodes includes an optical cross-connect. The optical cross-connect includes a plurality of first stage switch matrices, first and second cabinets, a plurality of middle stage switch matrices having input ports and output ports, and a plurality of last stage switch matrices having input ports and output ports. Each of the first stage switch matrices have a plurality of input ports, each input port receiving an input communication signal, and a larger number of output ports, where the first stage switch matrices switch the input communication signals to selected output ports. Each of the first and second cabinets have a predetermined number of bays, with at least one of the first stage switch matrices housed in a bay of the first cabinet and at least one of the first stage switches housed in a bay of the second cabinet. The input ports of the middle stage switch matrices are coupled to the output ports of the first stage switch matrices for receiving communication signals output from the first stage switch matrices. The middle stage switch matrices switch communications signals received at their input ports to their output ports. The input ports of the last stage switch matrices are coupled to the output ports of the middle stage switch matrices for receiving communication signals output from said middle stage switch matrices. The last stage switch matrices switch communications signals received at their input ports to their output ports.

The present invention further includes a method for scaling an optical cross-connect to a larger capacity, where the optical cross-connect includes first stage working switches, middle stage working switches having inputs coupled to outputs of the first stage working switches, and last stage working switches having inputs coupled to outputs of the middle stage working switches. The first, middle, and/or last stage switches can be formed by multistage switches themselves. The method comprising the steps of coupling the outputs of the first stage working switches and outputs of additional first stage working switches to inputs of replacement middle stage working switches, and coupling the inputs of the last stage working switches and inputs of additional last stage working switches to outputs of the replacement second stage working switches.

In addition, the present invention allows the complete replacement of the entire switch with an all-optical fabric that may have a smaller number of ports, but that allows for greater scalability because of its photonic nature. The individual ports can be run at higher bit rates.

The present invention further provides a communications switching apparatus for an optical telecommunications network including a plurality of first stage switch matrix cards, each having at least one first stage switch matrix with a plurality of inputs, each input receiving an input communication signal, and a larger number of outputs, where said first stage switch matrices switch the input communication signals to selected outputs; a plurality of last stage switch matrix cards, each having at least one last stage switch matrix with inputs and outputs, wherein said last stage switch matrices switch communications signals received at their input ports to selected output ports thereof, a frame having a first, second, and third groups of slots, wherein the first stage switch matrix cards are received in the first group of slots and the last stage switch matrix cards are received in the third group of slots, the second group of slots configured to receive middle stage switch matrix cards and optical extender module cards, the middle stage switch matrix cards each having at least one middle stage switch matrix having inputs and outputs, wherein the middle stage switch matrices switch communications signals received at their input ports to selected output ports; and a backplane coupled to the first stage switch matrix cards and the last stage switch matrix cards (1) for coupling the outputs of the first stage switch matrices to the inputs of the middle stage switch matrices and for coupling the outputs of the middle stage switch matrices to the inputs of the last stage switch matrices when the middle stage switch matrix cards are received in the second slots, and (2) for coupling communication signals from the outputs of the first stage switch matrices to the optical extender module cards and for coupling external communication signals received by the optical extender module cards to the inputs of the last stage switch when the optical extended module cards are received in the second slots.

The present invention further includes an optical communications switching apparatus for an optical communications network, comprising opto-electronic receivers for receiving optical signals on a plurality of optical fibers; an electronic switch matrix for switching electronic signals received from the first opto-electronic receivers, the electronic signals derived from the optical signals; and an optical switch matrix for switching signals from the electronic switch and optical signals from at least one optical fiber.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIGS. 3 and 4 illustrate an arrangement and technique for scaling the optical switch formed in the cabinet architecture of FIG. 2 to a higher capacity.

DESCRIPTION OF THE PREFERRED EMBODIMENT

It will be apparent to those skilled in the art that various modifications and variations can be made without departing from the scope or spirit of the invention.

Figure 1A:
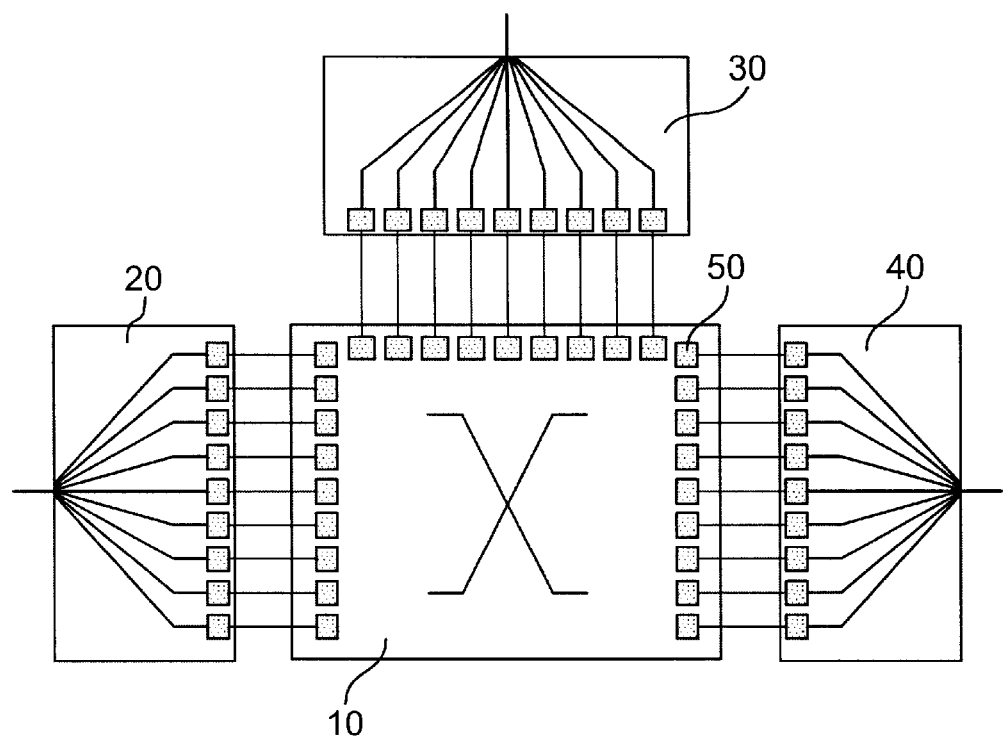
FIG. 1A provides a schematic of an optical cross-connect (OXC) coupled to wavelength division multiplexing/demultiplexing (WDM) equipment through transponders in accordance with a first embodiment of the invention.

FIG. 1A provides a schematic of an optical cross-connect (OXC) 10 coupled to wavelength division multiplexing/demultiplexing (WDM) equipment 20, 30 and 40 through transponders 50. Generally, the OXC 10 may be located at a network node. The OXC 10 may be connected in a mesh network, a ring network, a combination mesh/ring network, or another network architecture. OXC 10 serves. to switch incoming signals to selected output paths. The incoming signals to OXC 10 may have been received from other nodes in the network or from equipment of the same node as OXC 10. More particularly, OXC 10 may receive input signals from and/or transmit output signals to one or more of an IP router, an ATM switch, a synchronous optical network (SONET) add-drop multiplexer or other SONET equipment, equipment from another or the same node, local equipment, or other equipment. OXC 10 may switch inputs to outputs in accordance with internal control signal(s), an external control signal(s), and/or control signals received via the input signals.

For example, as shown in FIG. 1A, WDM optical signals may be transmitted to and received from other network nodes using WDM equipment 20, 30, and 40. The WDM equipment 20, 30, and 40 multiplex multiple optical wavelengths into WDM signals that may be transmitted to another node and demultiplex WDM signals received from other nodes into multiple optical wavelengths. OXC 10 may receive demultiplexed signals from one or more of WDM equipment 20, 30 and 40 and switch the received signals as appropriate to one or more of WDM equipment 20, 30, and 40 for multiplexing and transmission. While three WDM equipment are shown in FIG. 1A, any number of WDM equipment may be used consistent with the present invention.

OXC 10 may be configured to operate in point-to-point, multicast, and/or drop-and-continue modes. In a point-topoint mode, a single input signal to the OXC 10 is applied to a single output of OXC 10. For example, a demultiplexed signal received from WDM equipment 20 may be switched to WDM equipment 30 for transmission. Multicast mode involves the connection of a single input to multiple outputs. For example, a demultiplexed signal received from WDM equipment 20 may be switched to multiple channels of WDM equipment 30 or to both WDM equipment 30 and WDM equipment 40. Drop-and-continue mode allows a signal to be split for connection to a drop port for a local connection and also continue to another network destination. For example, assuming that WDM equipment 30 corresponds to a local connection, a demultiplexed signal received from WDM equipment 20 may be switched to WDM equipment 30 and to WDM equipment 40. The OXC 10 may be configured to operate in one or more of these modes simultaneously. For example, some input signals may be directed as point-to-point connections, others may be multicast, and yet others handled in drop-and-continue mode.

Figure 1B:
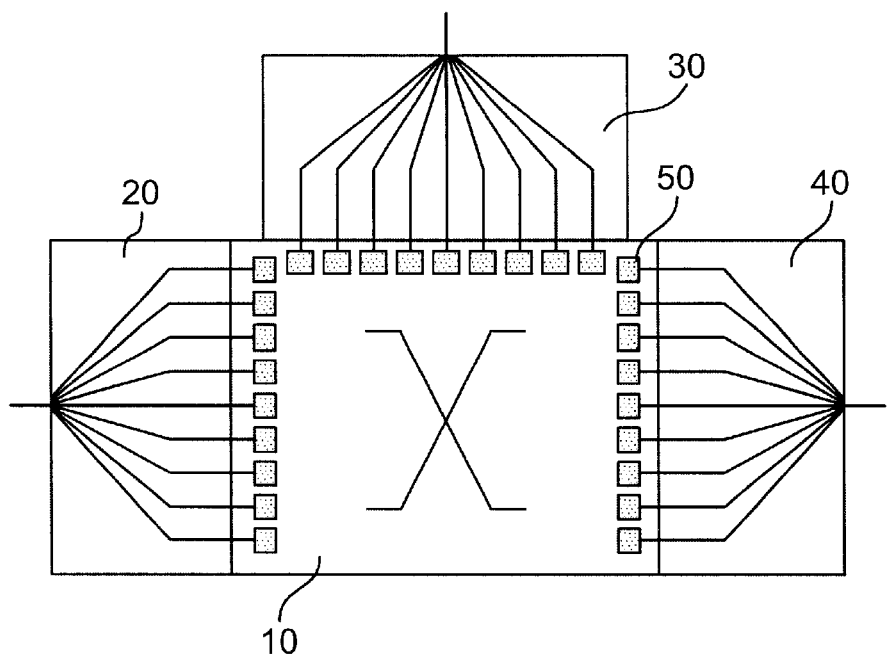
FIG. 1B illustrates a second embodiment of the invention in which the transport interface is built into the OXC.

FIG. 1B illustrates an alternate embodiment in which the transport interface is built into the OXC 10. Accordingly, separate transponders 50 are not required for WDM equipment 20, 30, and 40. This reduces the number of optical-to-electrical and electrical-to-optical conversions and reduces equipment costs.

Figure 1C:
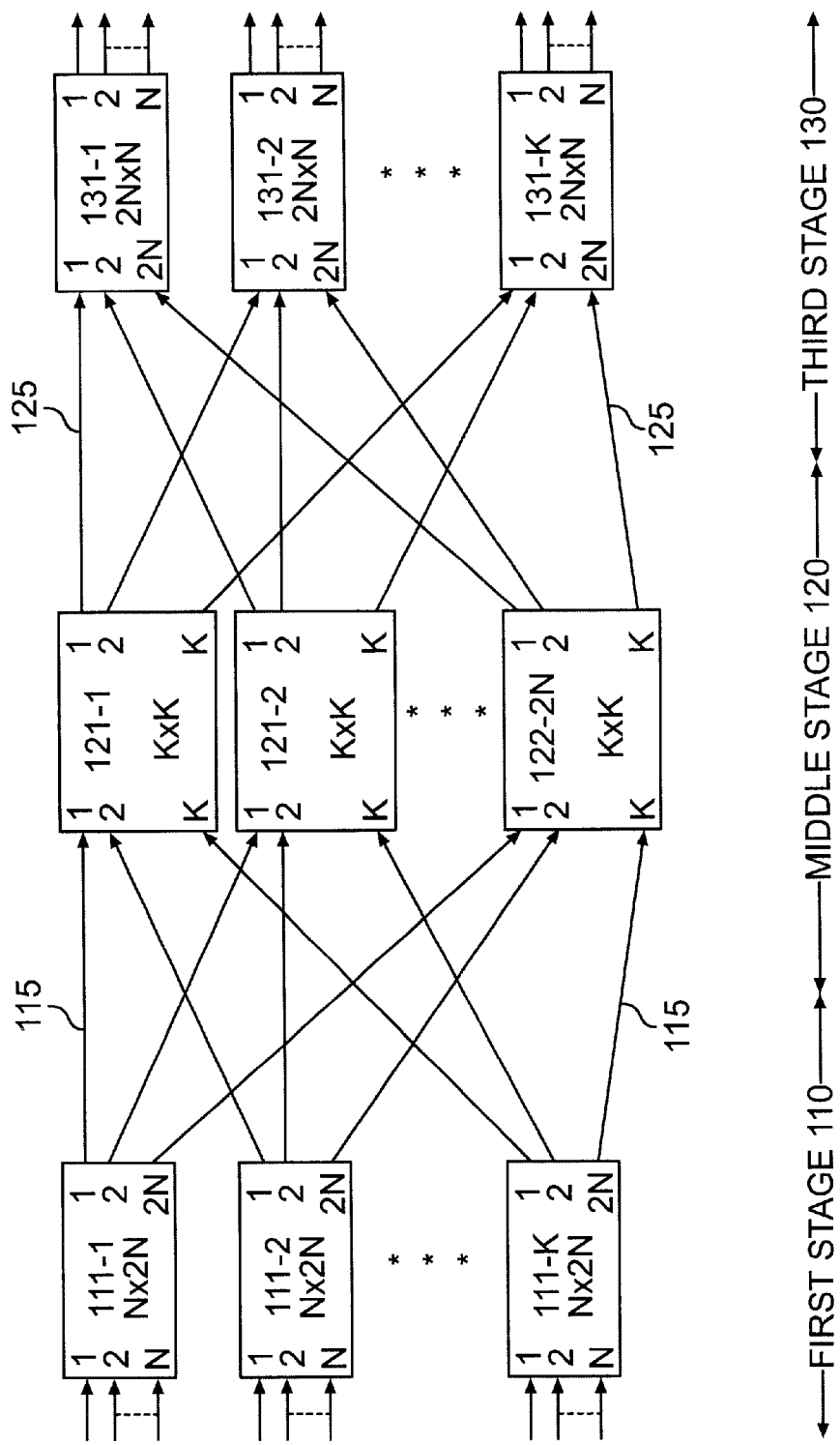
FIG. 1C illustrates an embodiment of an OXC in accordance with the present invention embodied as a three-stage Clos matrix having a first stage, a middle stage, and a last stage.

FIG. 1C illustrates an embodiment of an OXC embodied as a three-stage matrix 100 having a first stage 110, a middle stage 120, and a last stage 130. The first stage 110 can be connected to the middle stage 120 through a backplane 115 and the middle stage 120 can be coupled to the last stage 130 via abackplane 125. The backplanes 115 and 125 may be high-speed subsystems with embedded traces to carry signals (e.g., control signals and data signals) between the first stage 110 and middle stage 120 and between the middle stage 120 and last stage 130, respectively. The backplanes 115 and 125 may, for example, include plugs to receive cards on which the first, middle, and last stages 110, 120, and 130 are mounted. The backplanes may carry electrical and/or optical signals. They may simply comprise electrical cable or optical fiber. The backplanes 115 and 125 may also couple to optical extenders, as discussed in more detail below. Additional backplanes may be provided if the switch stages themselves include a multi-stage arrangement.

In general, the first stage 110 includes K switches 111-1 through 111-K (referred to collectively as first stage switches 111). Each of first stage switches 111 may receive N input signals and may produce 2N output signals. When the number of outputs is 2N-1, the result is a strictly non-blocking Clos architecture. The middle stage 120 includes 2N switches 121-1 through 121-2N (referred to collectively as middle stage switches 121). Each of the middle stage switches 121 receives an input signal from the K first stage switches 111. Accordingly, each of middle stage switches 121 receives at least K input signals. Each of the middle stage switches 121 produces at least K output signals. The last stage 130 includes K switches 131-1 through 131-K (referred to collectively as last stage switches 131). Each of the last stage switches 131 receives at least 2N input signals, one from each of middle stage switches 121. Last stage switches 131 produce at least N output signals. The matrix 10 is an K*N×K*N matrix because it includes K*N inputs and K*N outputs.

While each of switches 111 is shown to be of the same size, this need not be the case. Similarly, each of switches 121 and each of switches 131 need not be of the same size. Some or all of switches 111, 121, and/or 131 may be formed of smaller switch matrices. Further, some or all of switches 111 and some or all of switches 121 may be implemented by larger switches. For example, the N×2N switches 111 may be implemented using 2N×2N switches, for example. Switches 111, 121, and/or 131 may have additional input and/or output ports (not shown) that may be used for other purposes, such as testing, service channels, local connections, or other purposes.

Each switch of the first, middle, and last stage switches 111, 121, 131 may be formed on its own card, for example, a printed circuit board, or may be combined with other switches on the same card. The switches 111, 121, 131 may be electronic switches, optical switches, or hybrid switches including both electronic and optical components. For example, in an embodiment of FIG. 1C in which N=16 and K=32, the thirty-two (32) first and last stage switches 111 and 131 are 16×32 switches and 32×16 switches, respectively. The thirty-two (32) middle stage switches 121 are 32×32 switches. In this example, the three-stage Clos switch matrix is capable of switching 512 inputs to any of 512 outputs.

Figure 1D:
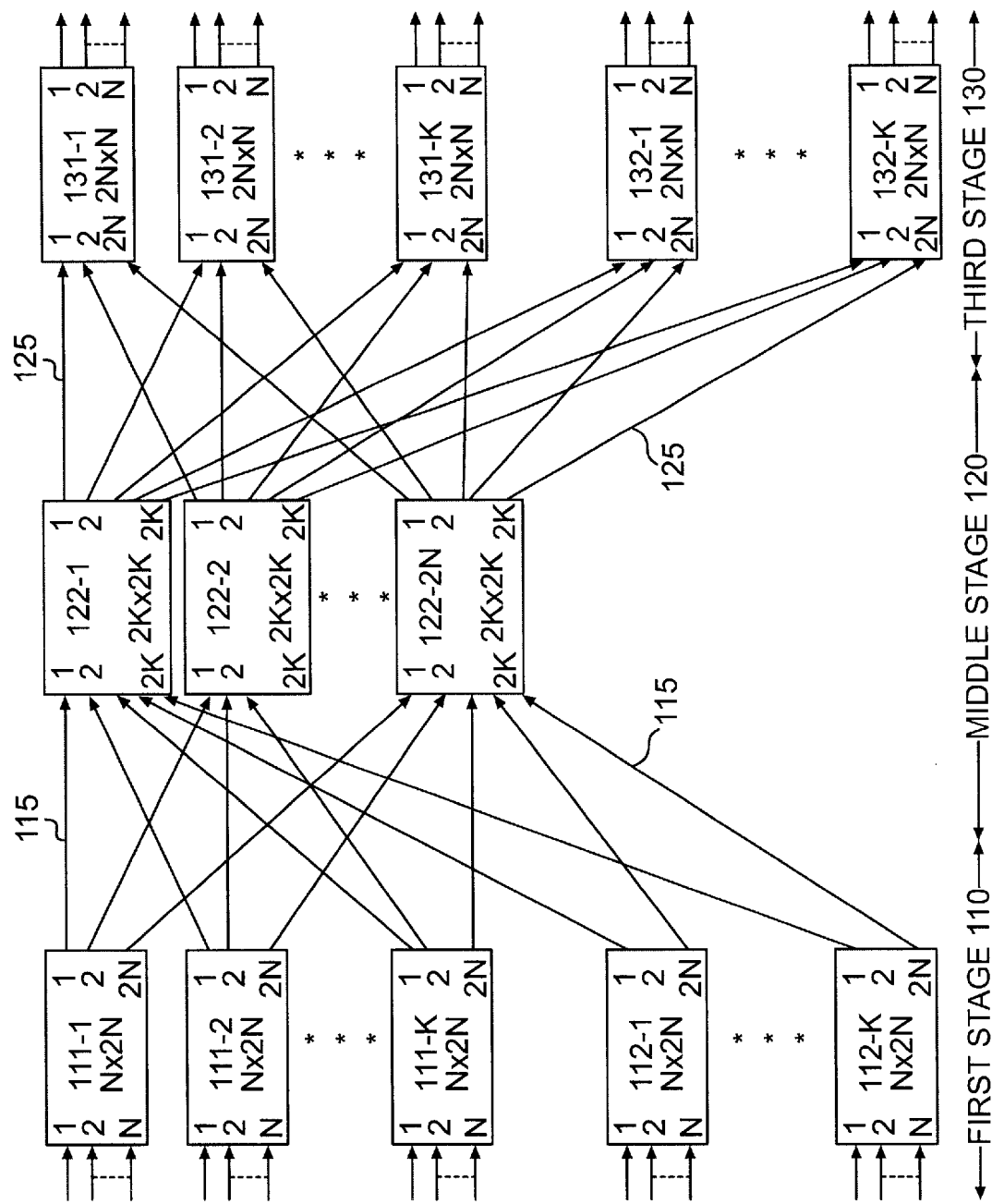
FIG. 1D illustrates an embodiment of an OXC scaled from that shown in FIG. 1C.

In accordance with the present invention, the three-stage switch matrix may be scaled without replacing the first and last stage switches 111 and 131. The middle stage switches 121 may be replaced to achieve scalability to arbitrary sizes. FIG. 1D illustrates the three-stage Clos switch matrix 100 scaled from an N×K capacity to a N×2K capacity by (1) adding K first stage switches 112-1 to 11 2-K, each having N inputs and 2N outputs and adding K last stage switches 132-1 to 132-K, each having 2N inputs and N outputs, and (2) replacing the middle stage switches 121 with 2N middle stage switches 122, each having 2K inputs and 2K outputs. Accordingly, the scaled matrix 100 has a total of 2K first stage switches 111, 112 with N×2N capacity; 2N middle stage switches 122 with 2K×2K capacity; and 2K last stage switches 131, 132 with 2N×N capacity.

Using the example described in connection with FIG. 1C, the three stage Clos matrix 100 of FIG. 1D may be scaled from a 512×512 matrix to a 1024×1024 matrix by (1) adding thirty-two (32) new first stage switches 112 and thirty-two (32) new last stage switches 132 to the existing first stage switches 111 and last stage switches 131, and (2) replacing the thirty-two (32) middle stage switches 121 with thirty-two (32) new 64×64 middle stage switches 122. Accordingly, the first stage 110 includes thirty-two (32) original first stage switches 111 and thirty-two (32) new first stage switches 112; the middle stage includes thirty-two (32) new middle stage switches 122; and the last stage 130 includes thirty-two (32) original last stage 131 and thirty-two (32) new last stage switches 132. Each of the new 64×64 middle stage switches 122 receives an input from the first stage switches 111 and 112 and supplies an output to each of the last stage switches 131 and 132. While this embodiment illustrates an arrangement in which the new first and last stage switches 112 and 132 are all the same size and the same size as the original first and last stage switches 111 and 131, it should be understood that the invention is not so limited. For example, some or all of the new first stage switches 112 may be multiples of the first stage switches 111, e.g., 32×64 switches and/or 8×16 switches, which, of course, will affect the number of switches needed. Of course, the same is true of the second stage switches 122 and the last stage switches 132.

FIG. 1D illustrates connections between the first stage 110 and the middle stage 120 are made via backplane 115 and that connections between the middles stage 120 and the last stage 130 are made via backplane 125. Of course, additional backplane capacity may be added when scaling the matrix. Further, additional equipment, such as electrical or optical extenders, may be used to facilitate the connections.

Figure 2:
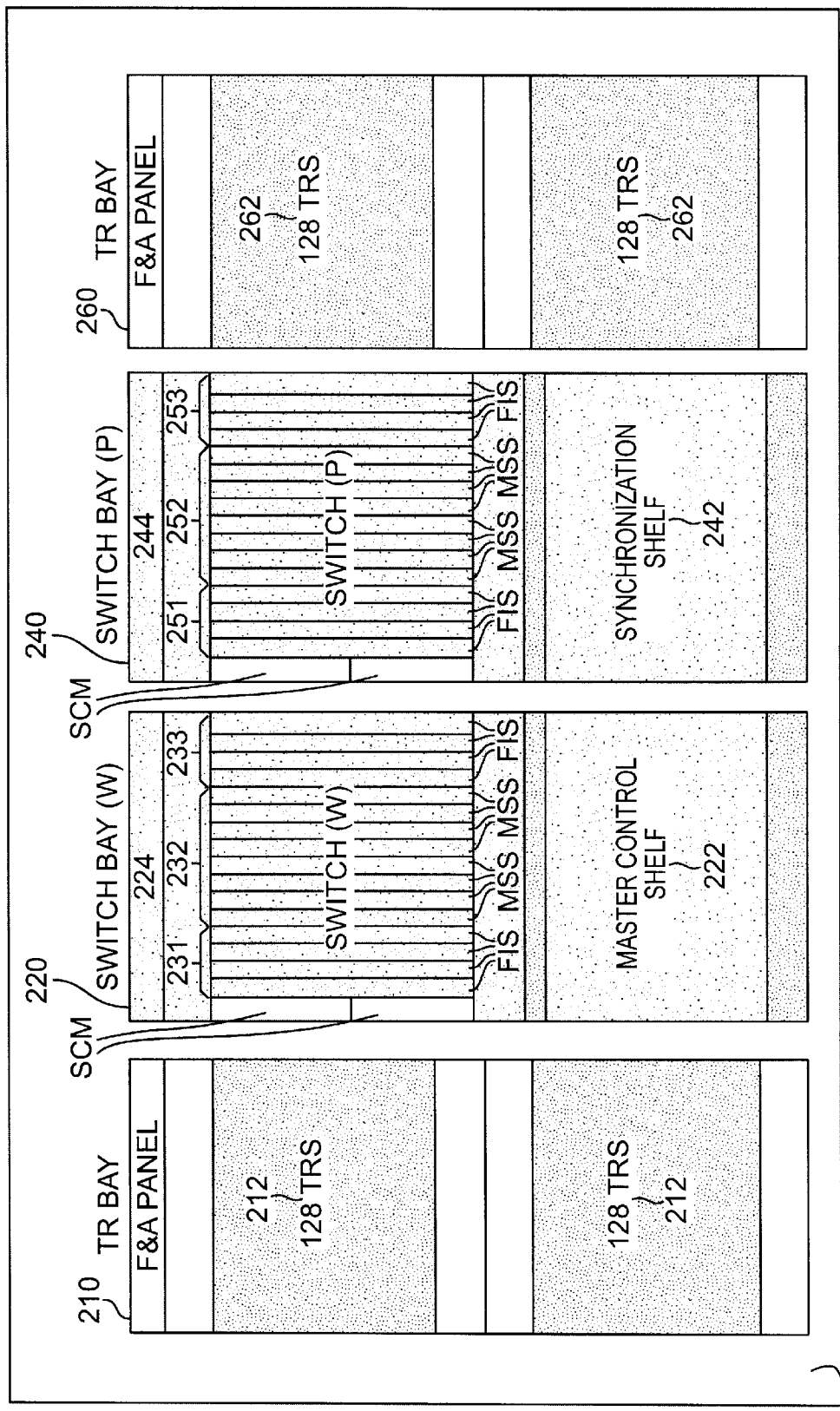
FIG. 2 illustrates a cabinet architecture that may be used in connection with the present invention.

FIG. 2 illustrates a cabinet architecture 200 that may be used in connection with the present invention. The cabinet architecture 200 includes four bays 210, 220, 240, and 260. The bays 210, 220, 230, and 240 may each comprise a frame structure having slots. Of course a frame structure may be provided absent a cabinet architecture and even a bay. The first bay 210 and the fourth bay 260 may be transmitter/receiver bays. For example, as shown in FIG. 2, the upper and lower portions of the first bay 210 and fourth bay 260 may each house 128 transmitter/receiver (transceiver) cards 212, 262 for a total of 512 bi-directional ports that support 2.5 Gb/s signals, such as standard OC-48 or STM-16 signals. In particular, the cards 212, 262 may be received in slots provided in the first and fourth bays 212, 262. Accordingly, the cabinet architecture 200 supports a 512×512 optical switch.

The second bay 220 may house master control equipment 222 and working switches 224. The working switches 224 may be arranged with eight (8) middle stage switch cards 232 sandwiched between four (4) first and last stage switch cards 231 and four (4) first and last stage switch cards 233, with the cards being received in slots. Each of the first/last stage switch cards 231 and the first/last stage switch cards 233 may hold, for example, four (4) first stage switches 111 and four (4) last stage switches 131. Each first stage switch 111 may be a 16×32 switch and each last stage 131 switch may be a 32×16 switch. Each of the middle stage switch cards 232 may hold, for example, four (4) middle stage switches 121. The middle stage switches 121 may be 32×32 switches. The first, middle, and last stage switches 111, 121, 131 may be interconnected as described above and as shown in FIG. 1C, for example, using backplanes (not shown) into which the switch cards plug.

The third bay 240 may house synchronization control equipment 242 and protection switches 244. In general, the protection switches 244 may be identical to the working switches 224. The working switches 224 are active during normal operations, with the protection switches 244 serving as back-ups to prevent or restrict service outage in the event that one or more working switches 224 malfunction. The protection switches 244 may be arranged similar to the working switches 224, with eight (8) middle stage protection switch cards 252 sandwiched between four (4) first/last stage protection switch cards 251 and four (4) first/last stage protection switch cards 253. Each of the first/last stage protection switch cards 251 and the first/last stage protection switch cards 253 may hold, for example, four (4) first stage protection switches 111 and four (4) last stage protection switches 131. Each of the middle stage protection switch cards 252 may hold, for example, four (4) middle stage protection switches 121. The cards may be inserted into slots. As above, the first stage switches 111 may be 16×32 switches, the middle stage switches 121 may be 32×32 switches, and the last stage switches 131 may be 32×16 switches. The first stage switches, the middle stage switches, and the last stage switches may be interconnected using one or more backplanes, as discussed above.

In some arrangements, there may be fewer protection switches 244 than working switches 224. It should be understood that any arrangement of first and last stage switch cards and/or switches may be used. The second and third bays 220 and 240 may also include shelf controller modules (SCM) for managing each shelf individually. A master controller module (not shown) integrates all SCMs for overall system control.

Figure 3:
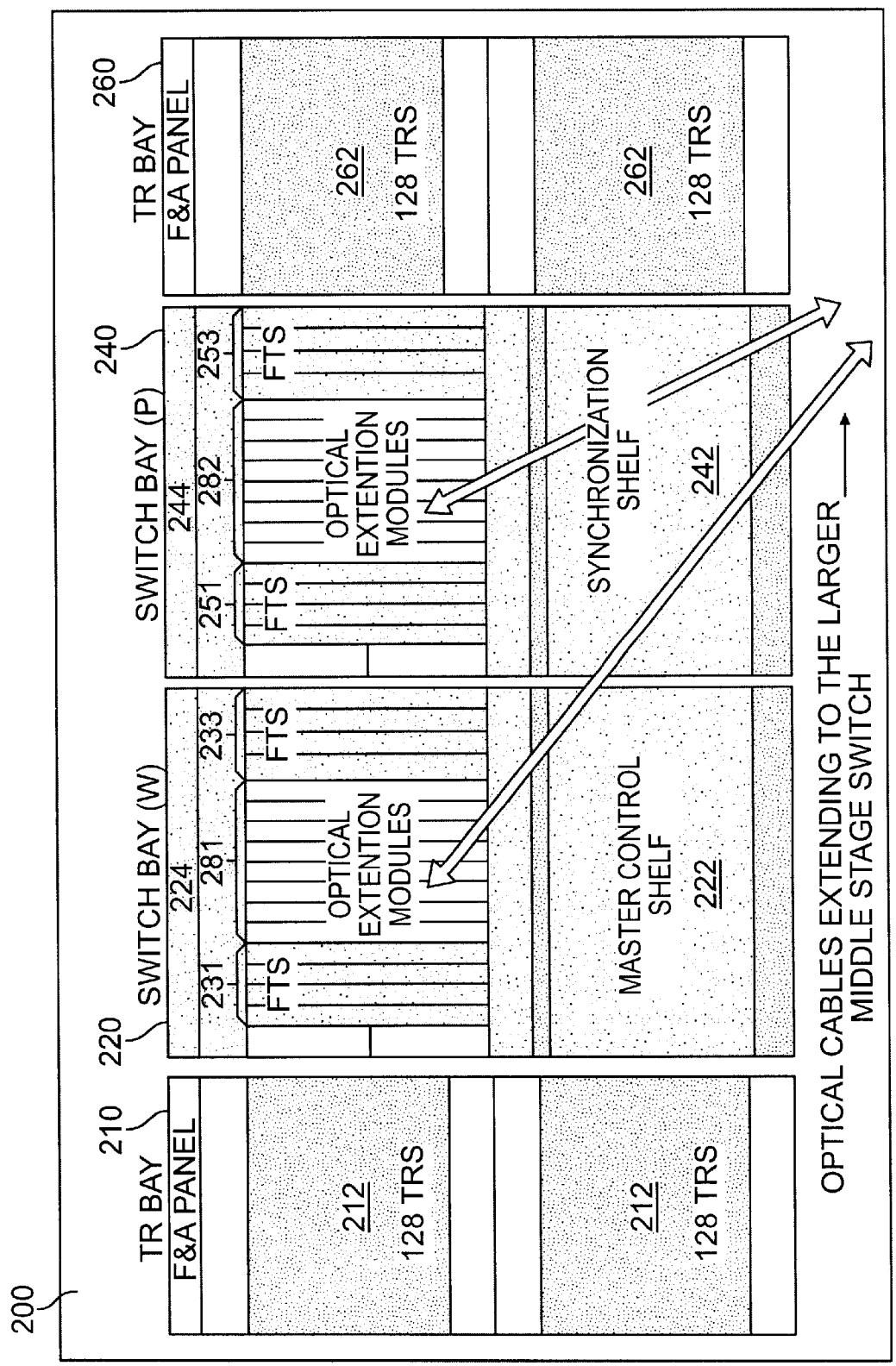

FIGS. 3 and 4 illustrate an arrangement and technique for scaling the 512×512 optical switch formed by cabinet 200 to a higher capacity. FIG. 3 illustrates cabinet 200 scaled to a higher switching capacity. In this case, the first and fourth bays 210 and 260 are unchanged. Further, the first and last stage switch cards 231, 233, 251, 253 are unchanged. However, optical extender modules (OEMs) 281, 282 have replaced middle stage switches 232, 252. For example, the OEMs 281, 282 may be provided on cards that are received in the slots previously occupied by the middle stage switch cards to interconnect with the backplane.

OEMs 281, 282 serve to optically interconnect the first and last stage switch cards 231, 233, 251, 253 to a larger middle stage matrix 500 via optical fibers, as discussed in greater detail below. The OEMs may include electro-optical converters to convert electrical signals to optical signals for transmission and/or opto-electrical converters to convert transmitted optical signals to electrical signals. Of course, one or both of electro-optical converters and opto-electrical converters may not be used, depending on the desirability of electrical or optical signals at a particular stage. OEMs are useful if electrical cables and/or backplane of the switching equipment make scaling difficult. Moreover, optical transmission may be used to improve signal quality over longer distances. Although the FIG. 3 illustrates optical extenders, the extenders may be electrical if the distances between the expanded middle stage matrix 500 and the existing matrix bays 220, 240 are short enough.

FIG. 4 shows the scaling of the 512×512 optical switch of cabinet 200 to a 1024×1024 optical switch. As shown in FIG. 4, a second cabinet 400 is deployed. The second cabinet 400 may be arranged in a similar way to that of first cabinet 200. In particular, the second cabinet 400 includes four bays 410, 420, 440, and 460. The first bay 410 and fourth bay 460 may be transmitter/receiver bays, which may each have upper and lower portions that house, for example, 128 transceiver cards 412, 462. For example, the 128 transceiver cards 412, 462 may accommodate a total of 512 bidirectional ports that support 2.5 Gb/s signals, such as standard OC-48 or STM-16 signals.

The second bay 420 of the second cabinet 440 may house equipment including working switches 424. The working switches 424 may be arranged such that eight (8) OEMs 481 are sandwiched between four (4) first and last stage switch cards 431 and four (4) first and last stage switch cards 433 in provided slots. Each of the first/last stage switch cards 431 and the first/last stage switch cards 433 may hold, for example, four (4) first stage switches 112 and four (4) last stage switches 132. The third bay 440 may house equipment including protection switches 444, which may be identical to the working switches 424. The working switches 424 are active during normal operations, with the protection switches 424 serving as back-ups to prevent or reduce service outage in the event that one or more working switches 424 malfunction. The protection switches 444 may be arranged similar to the working switches 424, with eight (8) OEMs 482 sandwiched between four (4) first and last stage protection switch cards 451 and four (4) first and last stage protection switch cards 453. Each of the first/last stage protection switch cards 451 and the first/last stage protection switch cards 453 may hold, for example, four (4) first stage protection switches 112 and four (4) last stage protection switches 132. In both the working switches 424 and the protection switches 444, the first stage switches 112 may be 16×32 switches and the last stage switches 132 may be 32×16 switches. The switches may be interconnected using one or more backplanes, for example, into which the switch cards plug.

FIG. 4 further includes a switching matrix 500, including working switch matrix 524, a protection switch matrix 544, and OEMs 581 and 582. A first bay 520 may house working switch matrix 524 and OEMs 581 and a second bay 540 may house the protection switch matrix 544 and OEMs 582. Working switch matrix 524 may include sixteen (16) working switch cards 532. Protection switch matrix may include sixteen (16) protection switch cards 552. Each of the working and protection switch cards 532, 552 may include two (2) middle stage switches 122, for a total of thirty-two (32) middle stage working switches and thirty-two (32) middle stage protection switches. The middle stage switches 122 in this case may be 64×64 switches. As above, the switch cards may be received in slots.

OEMs 581 interconnect switch matrix 524 between OEMs 381 of cabinet 200 and OEMs 481 of cabinet 400. Similarly, OEMs 582 interconnect protection switch matrix 544 between OEMs 282 of cabinet 200 and OEMs 482 of cabinet 400. Specifically, some of OEMs 581 are coupled to receive incoming signals from those OEMs 281 and 481 that couple to first stage switches on cards 231, 431. Incoming signals received by OEMs 581 are coupled as input signals to working switches 524. Output signals from working switches 524 are supplied to OEMs 581, which connect those outputs signals to the last stage switches on cards 233, 433 via OEMs 281, 481.

Similarly, some of OEMs 582 are coupled to receive incoming signals from those OEMs 282 and 482 that couple to first stage protection switches on cards 251, 451. The incoming signals received by OEMs 582 are coupled as input signals to protection switches 544. Output signals from protection switches 544 are supplied to OEMs 582, which connect those outputs signals to the last stage protection switches on cards 253, 453 via OEMs 282,482.

The scaled optical cross-connect arrangement illustrated in FIG. 4 includes four (4) bays 210, 260, 410, and 460 of optical input/output ports, two (2) bays of working first and last stage switches 220 and 420, two (2) bays of first and last stage protection switches 240 and 440, one (1) bay for the middle stage working switches 520, and one (1) bay for the middle stage protection switches 540.

The scaling of the switching matrix in FIG. 2 to the switching matrix shown in FIG. 4 can be made in-service. More particularly, the scaling may be achieved in an exclusively nonblocking manner, without requiring an interruption in service through the switching matrix. This may be accomplished as follows. Service is provided on cabinet 200 through one of the working switches 224 or the protection switches 244. For purposes of illustration, assume that service is provided on the working switches 224. The middle stage protection switches 252 may be swapped out of the third bay 240 in favor of OEMs 282. The OEMs 282 are connected to OEMs 582 so as to establish a connection path through middle stage protection switches 544 of switching matrix 500. At this point, the protection switches 244 of cabinet 200 can be filly interconnected with protection switches 544 of switching matrix 500 and protection switches 444 of cabinet 400. Accordingly, service on cabinet 200 can be switched over from working switches 224 to protection switches 244 without dropping service.

With service off of working switches 224, the middle stage switch cards 232 can be swapped out in favor of OEMs 281. As noted above, OEMs 281 may be connected to OEMs 581 to establish a connection path through the working switches 524 of switching matrix. In this way, the second bay 220 of cabinet 200 may be fully interconnected to the switching matrix 500 and the second cabinet 400. Service may be maintained on the protection switches of cabinets 200, cabinet 400, and switching matrix 500, reserving the working switches of cabinet 200, cabinet 400, and switching matrix 500 for protection. Accordingly, the protection switches would be effectively become the working switches, and the working switches would become the protection switches. Alternatively, service may be switched back over to the working switches, reserving the protection switches for protection.

It should be noted that although cabinet 200 was doubled in scale without a loss of service, only the working and protection middle stage switches 232 and 252 were replaced from the original arrangement of cabinet 200. Accordingly, the scaling arrangement and technique described herein is capable of reducing the equipment replaced in the changeover.

Moreover, while the above example illustrates an arrangement in which scaling is accomplished without loss of service where each working switch has a corresponding protection switch, scaling may also be accomplished without loss of service even in arrangements in which there are fewer protection switches than working switches. In such a case, the protection switches of cabinets 200 and 400 may be transitioned first to switching matrix 500 as described above, and then the working switches 232, 432 may be transitioned to switching matrix 500 in groups, for example of one or more cards at a time, with the protection switches providing service for each group of working switches while that group is being transitioned.

The example provided in FIGS. 2–4 is based upon the transition of a 512 port OXC to a 1024 port OXC. The following table illustrates the physical size of the OXC as a function of the number of cabinet bays it may occupy.

| # Ports | # I/O Bays | # 1st/Last SW Bays | | # Middle SW Bays | | Total # of Bays |
|---|---|---|---|---|---|---|
| | | Working | Protect | Working | Protect | |
| 512 | 2 | 1 Bay for working 1st, Mid, Lst SW | | | | 4 |
| | | 1 Bay for protection 1st, Mid, Lst SW | | | | |
| 1024 | 4 | 2 | 2 | 1 | 1 | 10 |
| 2048 | 8 | 4 | 4 | 2 | 2 | 20 |
| 8192 | 32 | 16 | 16 | 32 | 32 | 128 |

Figure 5A:
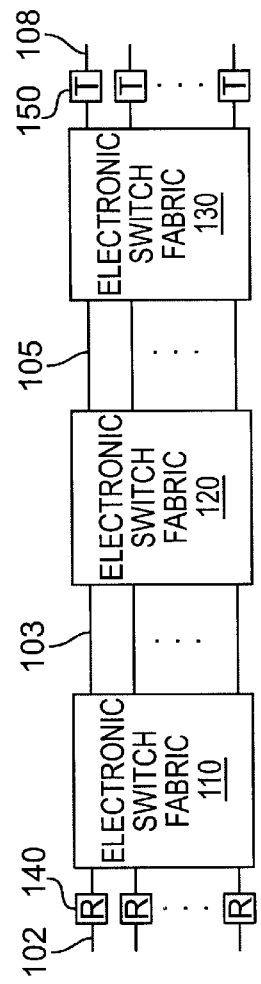
FIGS. 5A, 5B, and 5C illustrate possible switch arrangements for an OXC for the first, middle, and last stage switches in accordance with the present invention.
Figure 5B:
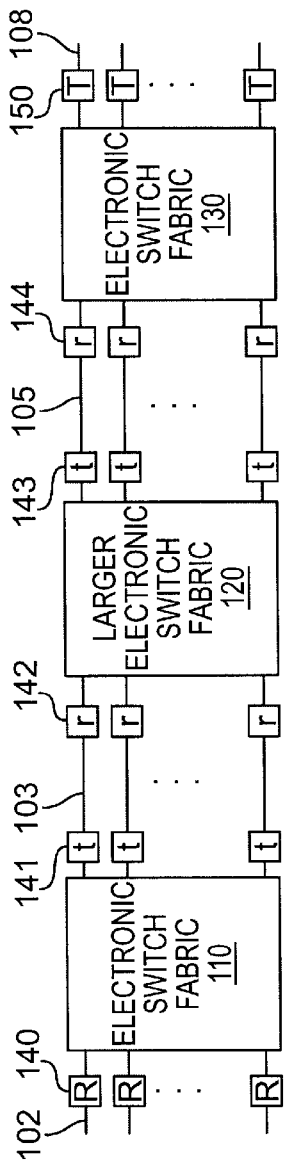
Figure 5C:
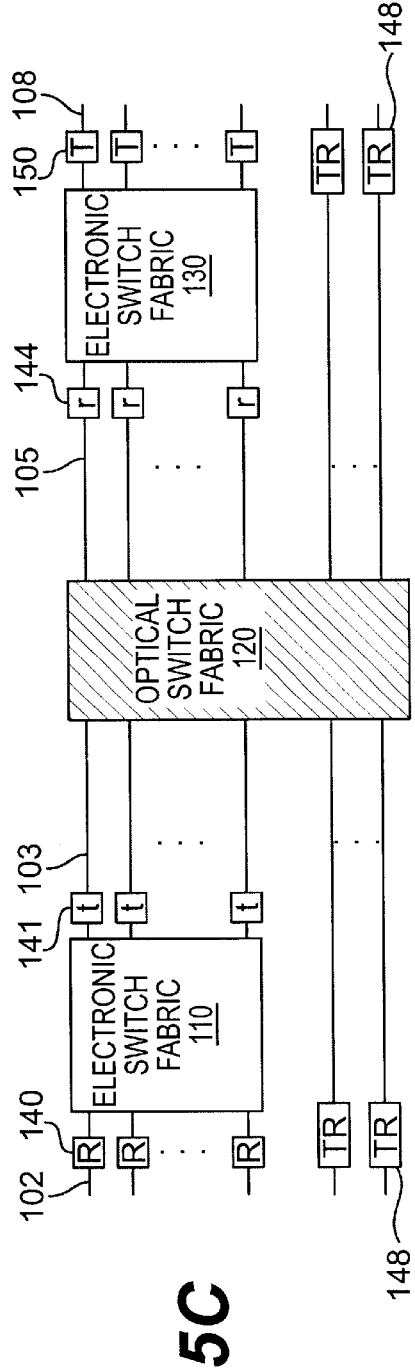

FIGS. 5A, 5B, and 5C illustrate possible switch arrangements for an OXC 10 for the first middle, and last stage switches 110, 120, and 130. FIG. 5A illustrates an arrangement in which each of the first stage switches 110, the middle stage switches 120, and the last stage switches 130 are each formed by an electronic switch fabric. Accordingly, incoming optical signals on transmission optical fibers 102 are received by opt-electrical receivers 140, which convert the incoming optical signals into electrical signals. The electrical signals are applied to the first stage switches 110. Electrical extensions 103 couple the output of the first stage 110 to the middle stage switches 120. Similarly, electrical extensions 105 couple the output of the middle stage switches 120 to the last stage switches 130. The output of the last stage switches 130 is received by electro-optical transmitters 150, converted into optical signals, and transmitted on transmission optical fibers 108. Transmission optical fibers 102 and 108 may be coupled to WDM equipment 20, 30, and 40, as illustrated in FIGS. 1A and 1B.

FIG. 5B illustrates an arrangement of OXC 10 in which the first, middle, and last stage switches are each formed by an electronic switch fabric. Incoming optical signals on optical fibers 102 are received by opto-electrical receivers 140, which convert the incoming optical signals into electrical signals. The electrical signals are applied to the first stage switches 110. The output of first stage switches 110 is converted into optical signals by electro-optical transmitters 141 and transmitted over optical fibers 104. The optical signals are received by opto-electrical receivers 142 and converted back into electrical signals. The electrical signals are applied to middle stage switches 120. The output of middle stage switches 120 is converted into optical signals by electro-optical transmitters 143 and transmitted over optical fibers 106. The optical signals are received by opto-electrical receivers 144, converted back into electrical signals, and applied to last stage switches 130. The output of the last stage switches 130 is received by electro-optical transmitters 150, converted into optical signals, and transmitted on optical fibers 108.

FIG. 5C illustrates a hybrid arrangement in which the first and last stage switches 110 and 130 are each formed by an electronic switch fabric and the middle stage switches 120 are formed by an optical switch fabric. Optical fibers 102 are coupled either to opto-electrical receivers 140 or to optical transmitter/receivers (TRs) 146. Moreover, if optical termination is not needed, optical fibers 102 may couple directly to the optical switch fabric 120. Opto-electrical receivers 140 receive incoming signals from optical fibers 102 and convert the incoming optical signals into electrical signals. The electrical signals are applied to the first stage switches 110. The output of first stage switches 110 is converted into optical signals by electro-optical transmitters 141 and transmitted over optical fibers 104. Additional equipment may be provided between the opto-electronic receivers 140 and the electro-optical transmitters 141, for example, to condition or groom the electrical signal. The optical signals from electro-optical transmitters 141 and from TRs 146 are applied to middle stage switches 120. The output of middle stage switches 120 is transmitted over optical fibers 106 to either opto-electrical receivers 144, to optical transmitter/receivers 148, or to optical fibers 108. Opto-electrical receivers 144 convert received optical signals into electrical signals and apply the electrical signals to last stage 130. The output of the last stage switches 130 is received by electro-optical transmitters 150, converted into optical signals, and transmitted on optical fibers 108. Additional equipment may be provided between the opto-electronic receivers 144 and the electro-optical transmitters 150, for example, to condition or groom the electrical signal. The optical signals received by optical TRs 148 are also transmitted on optical fibers 108. TRs 146, 148 may connect directly to transport fibers, for example, fibers 102 and 108, when those fibers are implemented as transport fibers. It should be noted that optical signals on a fiber 102 may be applied directly to the middle stage 120, which may switch the optical signals to an optical fiber 108 for transmission.

The hybrid electrical/optical architecture shown in FIG. 5C has a number of advantages. For example, the optical middle stage matrix 120 permits the electronic first and last stage matrices 110, 130 to be bypassed if necessary so that the TRs can connect directly to the optical middle stage matrix 120. This permits the format and/or bit rate of signals applied to middle stage 120 to be independent. For example, the TRs can be operated at 40 Gb/s without any demultiplexing down to signal sub-rates (such as OC-48). The entire signal received on the TRs can be switched if necessary.

Table 2 below illustrates exemplary scenarios for scaling an OXC to very large port counts where the size of the first and last stage switches remains constant, in this example 16×32 for the first stage switches and 32×16 for the last stage switches. Table 2 further assumes a constant data rate of 2.5 Gigabits/sec as an example. Of course the data rate may be different for some or all of the switches. Note that to achieve large port counts, the middle stage switches may be formed of multiple switch stages. For example, as shown in table 2, the middle stage switches may implemented using 32×32 electronic switch chips, a middle stage switch having 512 inputs and 512 outputs may be built using three stages of the 32×32 electronic switch chips. Table 2 additionally illustrates hybrid arrangements in which the first and last stages are composed of electrical switching components and the middle stage is composed of optical switching components.

TABLE 2

| Electrical Switch Fabric | | | | |
|---|---|---|---|---|
| Size of 1st/Lst stage | | | 16 × 32/32 × 16 | |
| Size of middle stage | 32 × 32 | 64 × 64 | 512 × 512 | 2048 × 2048 |
| No. of middle stages | 1 | 1 | 3 (32 × 32 chips) | 3 (64 × 64 chips) |
| Total number of stages | 3 | 3 | 5 | 5 |
| Fabric data rate | 2.5 Gb/s | 2.5 Gb/s | 2.5 Gb/s | 2.5 Gb/s |
| input/output ports | 512 | 1024 | 8192 | 32K |
| Total capacity | 1.28 Tb/s | 2.5 Tb/s | 20 Tb/s | 80 Tb/s |

| Hybrid-Electrical 1st/Last, Optical Middle Stages | | | | |
|---|---|---|---|---|
| Size of 1st/Lst stage | | | 16 × 32/32 × 16 | |
| Size of middle stage | 256 × 256 | 1024 × 1024 | 2048 × 2048 | 8192 × 8192 | 32768 × 32768 |
| No. of middle stages | 1 | 1 | 3 (64 × 64 Mod.) | 3 (128 × 128 Mod.) | 3 (256 × 256 Mod.) |
| Total number of stages | 3 | 3 | 5 | 5 | 5 |
| Fabric data rate | 2.5 Gb/s | 2.5 Gb/s | 2.5 Gb/s | 2.5 Gb/s | 2.5 Gb/s |
| Input/output ports | 4096 | 16K | 32K | 131K | 524K |
| Total capacity | 10 Tb/s | 40 Tb/s | 80 Tb/s | 328 Tb/s | 1310 Tb/s |

The electronic switch fabrics may be formed using gallium arsenide (GaAs), silicon bipolar, silicon germanium (SiGe), BiCMOS, or other semiconductor technologies. For example, the first, middle, and last stage switches 111, 121, 131 may be implemented using switches from several vendors. Moreover, switches having 10 Gigabits/sec. capacity are now becoming available.

Several different optical fabric switch designs may be used. For example, two-dimensional microelectromechanical systems (MEMS) switches, two-dimensional waveguided switches (such as a bubble switch), three-dimensional MEMS switches, or another optical switch fabric. For example, a two-dimensional MEMS switch may include an N×N array of movable mirrors, each of which can be positioned to reflect an incident beam or be moved out of the way to allow the beam to pass.

A two-dimensional waveguided switch may be, for example, Hewlett-Packard's bubble switch, which reduces beam diffraction by confining the light in two sets of intersecting waveguides. This is accomplished using a narrow trench etched across each waveguide intersection and that is filled with an index-matching fluid. A slot can be formed in a mirror, which will reflect light from one waveguide into the other, by vaporizing some of the fluid to form a bubble.

A three-dimensional MEMS switch, for example an Astarte switch, collimates inputs using a two-dimensional array of collimators, and each collimator is equipped with a multi-position, two-axis angular deflector mirror using MEMS-type technology. Each mirror can deflect its input beam to any output port. An additional set of collimators with angular deflectors is used to couple the output signals to output fibers. The signal beams are accompanied by alignment beams, which are used with active servo systems to hold the mirrors in position for the desired connections. It is preferable to use optical switch fabrics in which the physical size and the optical loss are as small as possible, and within practical limits.

One of the major advantages of the present invention is that the cross-connect capacity is scalable to arbitrary sizes in a modular fashion. In addition, as shown in FIG. 5C, a hybrid electrical/optical architecture using an optical middle stage matrix permits the electronic first and last stage matrices to be bypassed if necessary so that the TRs can connect directly to the optical matrix.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical cross-connect in an optical telecommunications network comprising:
    a plurality of first stage switch matrices, each of said first stage switch matrices having a plurality of input ports, each input port receiving an input communication signal, and a larger number of output ports, where said first stage switch matrices switch the input communication signals to selected output ports;
    first and second cabinets, each having one or more bays, wherein at least one of the first stage switch matrices is housed in a bay of said first cabinet and at least one of the first stage switches is housed in a bay of said second cabinet;
    a plurality of middle stage switch matrices having input ports and output ports, the input ports coupled to the output ports of said first stage switch matrices for receiving communication signals output from the first stage switch matrices, where said middle stage switch matrices switch communications signals received at their input ports to their output ports; and
    a plurality of last stage switch matrices having input ports and output ports, the input ports coupled to the output ports of said middle stage switch matrices for receiving communication signals output from said middle stage switch matrices, where said last stage switch matrices switch communications signals received at their input ports to their output ports.

2. An optical cross-connect according to claim 1, wherein the output ports of each of said first stage switch matrices couple to input ports of each of said middle stage switch matrices.

3. An optical cross-connect according to claim 2, wherein:
    each of said first stage switch matrices is coupled to each of the middle stage switch matrices; and
    each of said middle stage switch matrices is coupled to each of the first stage switch matrices.

4. An optical cross-connect according to claim 3, wherein at least one of said middle stage switch matrices is housed in a bay of a third cabinet.

5. An optical cross-connect according to claim 4, wherein at least one of the last stage switch matrices is housed in a bay of said first cabinet.

6. An optical cross-connect according to claim 5, wherein at least one of the last stage switch matrices is housed in a bay of said second cabinet.

7. An optical cross-connect according to claim 3, wherein the first stage switch matrices couple to the middle stage switch matrices using optical fiber links.

8. An optical cross-connect according to claim 1, wherein said first stage switch matrices operate at speeds of 155 Megabits per second or faster.

9. An optical cross-connect according to claim 1, wherein said first and last stage switch matrices comprise electronic switch fabrics.

10. An optical cross-connect according to claim 9, wherein said middle stage switch matrices comprise electronic switch fabrics.

11. An optical cross-connect according to claim 9, wherein said middle stage switch matrices comprise optical switch fabrics.

12. An optical cross-connect according to claim 1, where said middle stage switch matrices comprise multiple switch stages.

13. An optical telecommunications network comprising a plurality of network nodes interconnected via fiber optic links, wherein at least one of the network nodes includes an optical cross-connect comprising:
    a plurality of first stage switch matrices, each of said first stage switch matrices having a plurality of input ports, each input port receiving an input communication signal, and a larger number of output ports, where said first stage switch matrices switch the input communication signals to selected output ports;
    first and second cabinets, each having one or more bays, wherein at least one of the first stage switch matrices is housed in a bay of said first cabinet and at least one of the first stage switches is housed in a bay of said second cabinet;
    a plurality of middle stage switch matrices having input ports and output ports, the input ports coupled to the output ports of said first stage switch matrices for receiving communication signals output from the first stage switch matrices, where said middle stage switch matrices switch communications signals received at their input ports to their output ports; and
    a plurality of last stage switch matrices having input ports and output ports, the input ports coupled to the output ports of said middle stage switch matrices for receiving communication signals output from said middle stage switch matrices, where said last stage switch matrices switch communications signals received at their input ports to their output ports.

14. An optical telecommunications network according to claim 13, wherein said network nodes are arranged in a ring architecture.

15. An optical telecommunications network according to claim 13, wherein said network nodes are arranged in a mesh architecture.

16. An optical telecommunications network according to claim 13, wherein said network nodes transmit and receive wavelength division multiplexed optical signals.

17. An optical telecommunications network according to claim 13, wherein said first stage switch matrices operate at speeds of 155 megabits per second or faster.

18. A method for scaling an optical cross-connect to a larger capacity, wherein said optical cross-connect includes first stage working switches, middle stage working switches having inputs coupled to outputs of the first stage working switches, and last stage working switches having inputs coupled to outputs of the middle stage working switches, the method comprising the steps of:
    coupling the outputs of the first stage working switches and outputs of additional first stage working switches to inputs of replacement middle stage working switches; and
    coupling the inputs of the last stage working switches and inputs of additional last stage working switches to outputs of the replacement second stage working switches.

19. A method according to claim 18, wherein said optical cross-connect further comprises first stage protection switches, middle stage protection switches, and last stage protection switches, and further comprising the steps of:
    coupling outputs of the first stage protection switches and outputs of additional first stage protection switches to inputs of replacement middle stage protection switches; and
    coupling inputs of the last stage protection switches and inputs of additional last stage protection switches to outputs of the replacement second stage protection switches.

20. A method according to claim 19, wherein said step of coupling the outputs of the first stage protection switches and outputs of additional first stage protection switches and said step of coupling the inputs of the last stage protection switches and inputs of additional last stage protection switches occur before the step of coupling the outputs of the first stage working switches and outputs of additional first stage working switches and before the step of coupling the intputs of the last stage working switches and inputs of additional last stage working switches.

21. A method according to claim 20, further comprising the step of switching service over from the first, middle, and last stage working switches to the first, middle, and last stage protection switches after the step of coupling the outputs of the first stage protection switches and outputs of additional first stage protection switches and said step of coupling the inputs of the last stage protection switches and inputs of additional last stage protection switches, but before the step of coupling the outputs of the first stage working switches and outputs of additional first stage working switches and the step of coupling the inputs of the last stage working switches and inputs of additional last stage working switches.

22. A method according to claim 18, wherein said first stage optical switches operate at speeds of 155 megabits per second or faster.

23. A method according to claim 18, wherein said step of coupling the outputs of said first stage working switches and the outputs of said additional first stage working switches comprises, for each first stage working switch and for each additional first stage working switch, coupling respective outputs to the input of each replacement middle stage working switch, such that the inputs of each replacement middle stage switch are coupled to receive the output from each first stage protection switch and each additional first stage protection switch.

24. A method according to claim 18, wherein at least one of the first stage working switches is housed in a bay of a first cabinet and at least one of the additional first stage working switches is housed in a bay of a second cabinet.

25. A method according to claim 24, wherein at least one of said replacement middle stage switches is housed in a bay of a third cabinet.

26. A method according to claim 25, wherein at least one of the last stage working switches is housed in a bay of said first cabinet.

27. A method according to claim 25, wherein at least one of the additional last stage working switches is housed in a bay of said second cabinet.

28. A method according to claim 18, wherein said first and additional first stage working switches and said third and additional last stage working switches comprise electronic switch fabrics.

29. A method according to claim 28, wherein said replacement middle stage switches have electronic switch fabrics.

30. A method according to claim 28, wherein said replacement second stage switch have optical switch fabrics.

31. A communications switching apparatus for an optical telecommunications network comprising:
    a plurality of first stage switch matrix cards, each having at least one first stage switch matrix with a plurality of inputs, each input receiving an input communication signal, and a larger number of outputs, where said first stage switch matrices switch the input communication signals to selected outputs;
    a plurality of last stage switch matrix cards, each having at least one last stage switch matrix with inputs and outputs, wherein said last stage switch matrices switch communications signals received at their input ports to selected output ports thereof,
    a frame having a first, second, and third groups of slots, wherein said first stage switch matrix cards are received in the first group of slots and the last stage switch matrix cards are received in the third group of slots, the second group of slots configured to receive middle stage switch matrix cards and optical extender module cards, the middle stage switch matrix cards each having at least one middle stage switch matrix having inputs and outputs, wherein said middle stage switch matrices switch communications signals received at their input ports to selected output ports; and
    a backplane coupled to said first stage switch matrix cards and said last stage switch matrix cards (1) for coupling said outputs of said first stage switch matrices to said inputs of said middle stage switch matrices and for coupling said outputs of said middle stage switch matrices to said inputs of said last stage switch matrices when said middle stage switch matrix cards are received in said second slots, and (2) for coupling communication signals from said outputs of said first stage switch matrices to said optical extender module cards and for coupling external communication signals received by said optical extender module cards to said inputs of said last stage switch when said optical extended module cards are received in said second slots.

32. A communications switching apparatus according to claim 31, wherein said first stage switch matrices operate at speeds of 155 megabits per second or faster.

33. A communications switching apparatus according to claim 31, wherein said first and last stage switch matrices comprise electronic switch fabrics.

34. A communications switching apparatus according to claim 31, wherein said middle stage switch matrices comprise electronic switch fabrics.

35. A communications switching apparatus according to claim 31, wherein said first stage switch matrix cards including third stage switches and said third stage switch matrix cards include first stage switches.

36. An optical communications switching apparatus for an optical communications network, comprising:
    opto-electronic receivers for receiving optical signals on a plurality of optical fibers;
    an electronic switch matrix for switching electronic signals received from said first opto-electronic receivers, said electronic signals derived from the optical signals; and
    an optical switch matrix for switching signals from said electronic switch and optical signals from at least one optical fiber.

37. An optical communications switching apparatus according to claim 36, further comprising at least one optical transceiver for receiving an optical signal from an optical fiber and for supplying at least one optical signal to said optical switch matrix.

38. An optical communications switching apparatus according to claim 36, wherein said at least one optical fiber is a transmission optical fiber.

39. An optical communications switching apparatus according to claim 36, further comprising:
    a further electronic switch matrix for receiving electronic signals derived from optical signals output by said optical switch matrix; and
    opto-electric transmitters for transmitting optical signals over one or more optical fibers corresponding to those output from said further electronic switch matrix.

40. An optical communications switching apparatus according to claim 39, further comprising:
    at least one optical transceiver for receiving at least one optical signal from an optical fiber and for supplying at least one optical signal to said optical switch matrix; and
    at least one optical transceiver for receiving at least one optical signal from said optical switch matrix and for transmitting the received at least one optical signal on an optical fiber.

41. An optical communications switching apparatus according to claim 40, wherein said optical switch matrix receives at least one optical signal directly from an optical transmission fiber.

42. An optical switch system for use in an optical communication network comprising:
    first optical receivers for receiving input optical signals on input optical fibers,
    said optical receivers converting the input optical signals to electronic signals; a first electronic switch having inputs coupled to said optical receivers, said first electronic switch switchably coupling received electronic signals from its inputs to selected outputs; first optical transmitters coupled to receive electronic signals from said first electronic switch, said first optical transmitters converting the electronic signals received from said first electronic switch to optical signals;
    an optical switch having inputs coupled to receive optical signals from said first optical transmitters, said optical switch switchably coupling the received optical signals from its inputs to selected optical outputs;
    second optical receivers coupled to receive optical signals output from said optical switch, said optical receivers converting the received optical signals to electronic signals;
    a second electronic switch coupled to receive electronic signals output from said second optical receivers, said second electronic switch switchably coupling the received electronic signals to selected outputs; and
    second optical transmitters coupled to receive electronic signals output from said second optical switch, said second optical transmitters converting received electronic signals to optical signals and transmitting the optical signals over output optical fibers.

43. An optical switch system according to claim 42, further comprising:
    first optical transceivers for receiving input optical signals from a plurality of second input optical fibers and supplying the received optical signals to said optical switch; and
    second optical transceivers for receiving optical signals output from said optical switch and for transmitting the received optical signals on a plurality of second output fibers.

44. An optical switch system according to claim 43, further comprising:
    one or more third input optical fibers carrying optical signals, said one or more third input optical fibers coupled to said optical switch; and
    one or more third output optical fibers coupled to said optical switch, said third output optical fibers carrying optical signals received from said optical switch.

45. An optical switch system according to claim 42, further comprising:
    one or more second input optical fibers carrying optical signals, said one or more second input optical fibers coupled to said optical switch; and
    one or more second output optical fibers coupled to said optical switch, said one or more second output optical fibers carrying optical signals received from said optical switch.

46. An optical switch for use in an optical communication network, comprising:
    first optical transceivers for receiving input optical signals on input optical fibers, said first optical transceivers providing optical termination of said input optical signals and outputting optical signals based on the input optical signals;
    an optical switch, coupled to receive optical signals output from said optical transceivers, said optical switch switchably coupling received optical signals to selected outputs; and
    second optical transceivers for receiving optical signals output from said optical switch, for providing optical termination of the received optical signals, and for transmitting the optical signals based on the received optical signals on output optical fibers.

47. An optical switch system according to claim 46, further comprising:

one or more second input optical transport fibers carrying optical signals to said optical switch; and one or more second output optical transport fibers coupled to said optical switch, said second output optical transport fibers carrying optical signals received from said optical switch.

48. An optical switch system according to claim 46, further comprising:

first optical receivers for receiving input optical signals on second input optical fibers, said first optical receivers converting the input optical signals to electronic signals;

a first electronic switch having inputs coupled to said first optical receivers, said first electronic switch switchably coupling received electronic signals from its inputs to selected outputs of the first electronic switch;

first optical transmitters coupled to outputs of said first electronic switch, said first optical transmitters converting electronic signals received from said first electronic switch to optical signals and supplying the converted optical signals to the optical switch;

second optical receivers coupled to receive optical signals output from said optical switch, said optical receivers converting the received optical signals to electronic signals;

a second electronic switch coupled to outputs of said second optical receivers, said second electronic switch for switchably coupling received electronic signals to selected outputs of said second electronic switch; and second optical transmitters coupled to receive electronic signals output from said second optical switch, said second optical transmitters converting received electronic signals to optical signals and transmitting the optical signals over second output optical fibers.

49. An optical switch system according to claim 48, finther comprising:

one or more input optical transport fibers carrying optical signals to said optical switch; and one or more output optical transport fibers coupled to said optical switch, said output optical transport fibers carrying optical signals received from said optical switch.

* * * * *